June 13, 1933.  B. Z. WOODRUFF  1,914,228
AUTOMOBILE WINDOW SCREEN
Filed Oct. 24, 1931
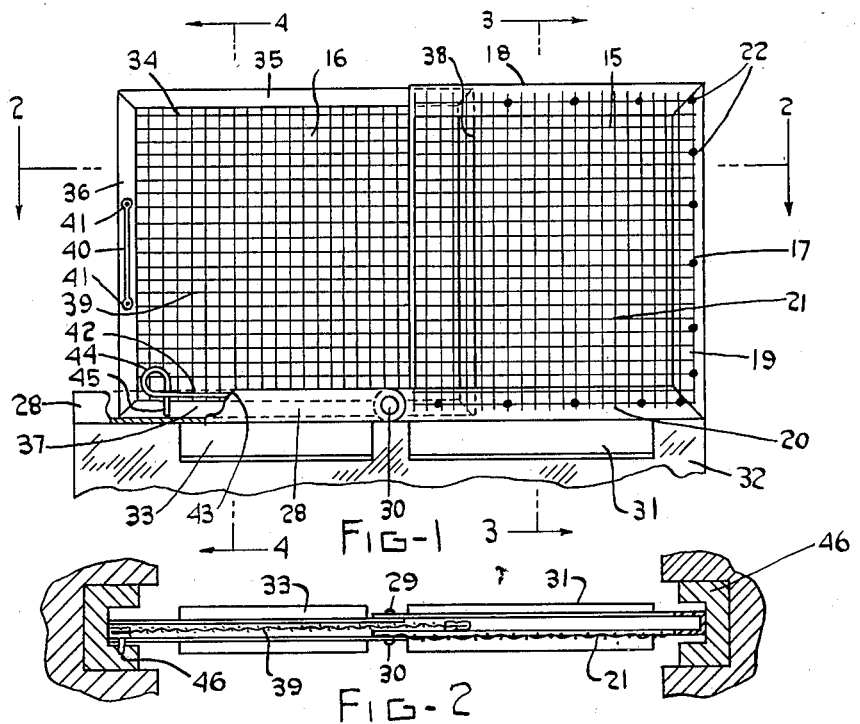
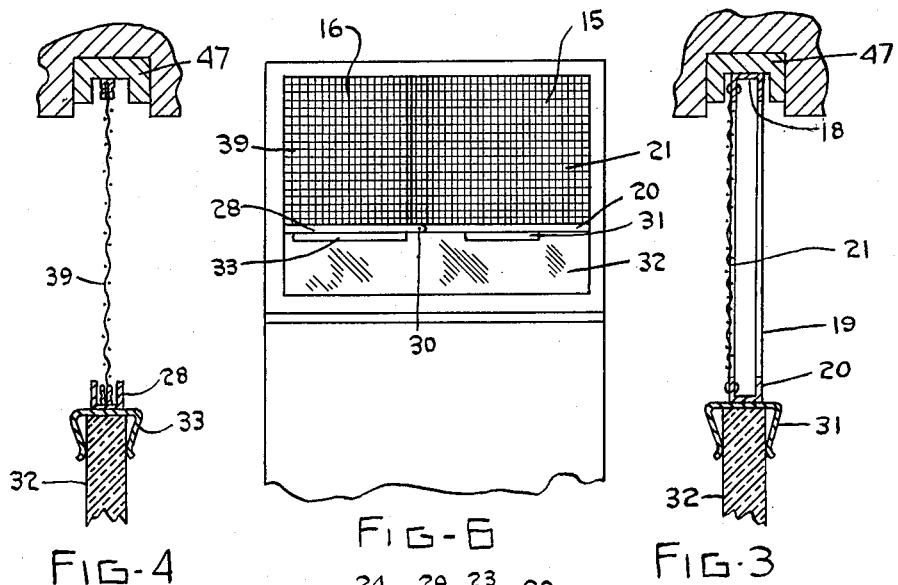
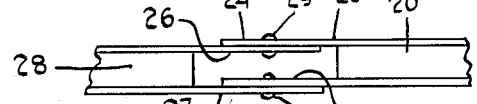
INVENTOR
B. Z. Woodruff
BY E. J. Fetherstonhaugh
ATTORNEY Patented June 13, 1933

1,914,228

UNITED STATES PATENT OFFICE

BURTON ZAVITZ WOODRUFF, OF NIAGARA FALLS, ONTARIO, CANADA

AUTOMOBILE WINDOW SCREEN

Application filed October 24, 1931. Serial No. 570,848.

The invention relates to automobile window screens, as described in the present specification and illustrated in the accompanying drawing that forms part of the same.

This invention consists essentially of the mounting of the screens in relation to the window construction as pointed out in the claims for novelty, following a description in detail of the constructive features of the screen members pertaining to said mounting.

The objects of the invention are to screen the openings following the dropping of the window panes and thereby eliminate to a large extent the numerous accidents resulting from the poisonous fumes of carbon monoxide gas as well as shutting out bees, flies and flying stones and other objects or insects liable to disturb and distract the motorist, to simplify the fastening of the screen and furnish adjustability suitable for all cars of conventional pattern and generally to provide additional precautions for the comfort of drivers and passengers in motor cars.

In the drawing, Figure 1 is an elevational view of the screen showing it attached to a window pane.

Figure 2 is a cross sectional view, taken on the line 2—2 Figure 1.

Figure 3 is a vertical sectional view of the fixed screen section, taken on the line 3—3 Figure 1.

Figure 4 is a vertical sectional view of the sliding screen section, taken on the line 4—4 Figure 1.

Figure 5 is an enlarged plan view of the flexible joint of the slideway parts.

And Figure 6 is a side elevational view of an automobile door with the window screen installed.

Like numerals of reference indicate corresponding parts in the various views.

Referring to the drawing, the window screen is formed in two sections, namely, the fixed section 15 and the sliding section 16. The fixed section 15 has the U-shaped channel frame 17 which is bent to form the three sides 18, 19 and 20. A suitable wire mesh screen 21 is attached to the outside of the frame by the rivets 22 as shown, or by any other suitable method. The lower edge 20 of the frame 17 is extended at 23 to form arms 24 and 25, to which are connected the arms 26 and 27 of the extension channel member 28, by means of the rivets 29 and 30. These rivets are attached in such a manner to permit the extension 28 to pivot with relation to the frame 17. A spring clip 31 is secured to the lower edge 20 of the frame 17 and is shaped to grip the glass or window pane 32 to hold the fixed screen in position, a similar clip is attached to the extension 28.

It will be noted that the lower edge 20 of the frame 17 and the extension 28 form one continuous channel or slideway across the upper edge of the window pane.

The second or sliding section 16 is inserted in the slideway formed by the lower edge of the fixed section 17 and the channeled extension member 28, and consists of the frame 34 of U-shaped material having the sides 35, 36, 37 and 38; a suitable wire mesh screen 39 is inserted in the frame 34, after which the edges of the frame are crimped or flattened to hold the screen 39 securely in place. The operating handle 40 is secured to the frame 34 by the rivets 41.

A spring catch 42 is provided to retain the sliding screen in position with relation to the fixed screen; this catch is made of spring steel wire or any other suitable material and is secured to the extension member 28 at 43, the free end is brought forward and looped at 44 and the extreme end 45 then bent downwardly and inwardly toward the edge of the screen frame 34 to press against the frame 34 and hold it tightly at all times.

To instal the window screen, the car window is lowered, the sliding screen is inserted in the slideway of the fixed screen 17 after which the fixed screen and the slideway extension 28 are clipped to the upper edge of the window pane 32 by the clips 31 and 33. The fixed frame is of course positioned at the extreme edge of the window frame and abuts the felt or rubber pad 46 which holds the glass in the door frame. The window is raised and the upper edge of the window screen will fit closely into the upper felt or rubber pad 47 and the whole window screen will then be held firmly in place.

When it is desired to signal turns or if it is necessary to open the screen for any purpose, the handle 40 is grasped and the sliding part of the screen may then be moved; the spring catch 42 will hold the screen in open position until same is closed again by the operator.

It is of course, to be understood that while I have explained my window screen in detail, various modifications could be made without departing from the spirit of the invention as specifically set forth in the following claims.

What I claim is:

1. An automobile window screen, comprising a fixed screen having a U-shaped channel frame, an extension hinged to the lower part of said frame, a sliding screen telescoping, in the frame of said fixed screen and means for holding the window screen in position.

2. An automobile window screen, comprising a fixed screen having a U-shaped channel frame, an extension hinged to the lower part of said frame, a sliding screen telescoping in the frame of said fixed screen and clips on said fixed screen and said extension for holding the window screen in position.

3. An automobile window screen, comprising a fixed screen having a U-shaped channel frame, an extension hinged to the lower part of said frame, a sliding screen telescoping in the frame of said fixed screen, an operating handle on said sliding screen and clips on said fixed screen and said extension for holding the window screen in position.

4. An automobile window screen, comprising a fixed screen having a U-shaped channel frame, an extension hinged to the lower part of said frame, a sliding screen telescoping in the frame of said fixed screen, an operating handle on said sliding screen, means for adjustably retaining the sliding screen with relation to the fixed screen and clips on said fixed screen and said extension for holding the window screen in position.

5. An automobile window screen, comprising a fixed screen having a U-shaped channel frame, an extension hinged to the lower part of said frame, a sliding screen telescoping in the frame of said fixed screen, an operating handle on said sliding screen, means for adjustably retaining the sliding screen with relation to the fixed screen and spring clips on said fixed screen and said extension for holding the window screen in position.

6. An automobile window screen, comprising a fixed screen having a U-shaped channel frame, an extension hinged to the lower part of said frame, a sliding screen telescoping in the frame of said fixed screen, an operating handle on said sliding screen, spring clips on said fixed screen and said extension for holding the window screen in position and a spring catch on said extension for adjustably retaining the sliding screen with relation to the said fixed screen.

Signed at Niagara Falls, Canada, this 29 day of Aug. 1931.

BURTON ZAVITZ WOODRUFF.